US008716364B2

United States Patent
Kamei

(10) Patent No.: US 8,716,364 B2
(45) Date of Patent: May 6, 2014

(54) SURFACE-COATED REINFORCING MATERIAL, FLUID COMPOSITION FOR REACTION INJECTION MOLDING, AND ARTICLE FORMED BY REACTION INJECTION MOLDING

(75) Inventor: Nobuhito Kamei, Tokyo (JP)

(73) Assignee: Rimtec Corporation, Tokyo (JP)

( * ) Notice: Subject to any disclaimer, the term of this patent is extended or adjusted under 35 U.S.C. 154(b) by 0 days.

(21) Appl. No.: 13/518,979

(22) PCT Filed: Dec. 22, 2010

(86) PCT No.: PCT/JP2010/073195
§ 371 (c)(1),
(2), (4) Date: Jun. 25, 2012

(87) PCT Pub. No.: WO2011/078256
PCT Pub. Date: Jun. 30, 2011

(65) Prior Publication Data
US 2012/0259053 A1 Oct. 11, 2012

(30) Foreign Application Priority Data
Dec. 25, 2009 (JP) ................................ 2009-295719

(51) Int. Cl.
*C08K 9/00* (2006.01)
(52) U.S. Cl.
USPC .......................................... 523/200; 428/448
(58) Field of Classification Search
USPC .................... 106/404, 417; 523/200; 524/443; 428/448
See application file for complete search history.

(56) References Cited

U.S. PATENT DOCUMENTS 5,055,499 A    10/1991    Endo et al.

FOREIGN PATENT DOCUMENTS

| JP | 2-185558 A | 7/1990 |
| JP | 2006-116414 A | 5/2006 |
| JP | 2007-224123 A | 9/2007 |
| JP | 2008-208157 A | 9/2008 |

OTHER PUBLICATIONS

Machine Translation of JP 2008-208157.*
Machine Translation of JP 2009-020085.*
Notification of Transmittal of Translation of the International Preliminary Report on Patentability (Form PCT/IB/338) of International Application No. PCT/JP2010/073195 mailed Aug. 23, 2012 with Forms PCT/IB/373 and PCT/ISA/237.
International Search Report of PCT/JP2010/073195, mailing date Mar. 15, 2011.

* cited by examiner

*Primary Examiner* — Hannah Pak
(74) *Attorney, Agent, or Firm* — Westerman, Hattori, Daniels & Adrian, LLP

(57) ABSTRACT

Provided is a surface-coated reinforcing material which, when used in a fluid composition for reaction injection molding, causes substantially no increase in the viscosity of said fluid composition and can be well dispersed therein, and can improve the rigidity of an article obtained by reaction injection molding the same. The surface-coated reinforcing material is provided, on the surface of a reinforcing material, with laminated coating layers consisting of one or more coating layers (A), which comprise a silane coupling agent (I) having at least one hydrocarbon group having a norbornene structure, and one or more coating layers (B), which comprise a coupling agent other than the silane coupling agent (I) and/or a fatty acid.

9 Claims, No Drawings

SURFACE-COATED REINFORCING MATERIAL, FLUID COMPOSITION FOR REACTION INJECTION MOLDING, AND ARTICLE FORMED BY REACTION INJECTION MOLDING

TECHNICAL FIELD

The present invention relates to a surface-coated reinforcing material, a fluid composition for reaction injection molding including the surface-coated reinforcing material, and an article formed by a reaction injection molding.

BACKGROUND ART

A reaction injection molding method is widely known as the method to obtain an article made from a norbornene polymer by simultaneously carrying out a molding and a bulk polymerization of a norbornene monomer such as norbornene, dicyclopentadiene and tetracyclododecene or so using a metathesis polymerization catalyst. The reaction injection molding method typically carries out the collisional mixing of a first preliminary fluid composition comprising a monomer and a catalyst with the second preliminary fluid composition comprising a monomer and a co-catalyst, and the obtained fluid composition having polymerization reactivity (the polymerizable reaction fluid) is filled (injected) in the mold, then the polymerization reaction and the molding are carried out at the same time by heat curing. The obtained article generally has a good mechanical strength, heat resistance, and dimensional stability, and it is used in automobile, agricultural equipment and a member of construction equipment or so, or housing for an electronic machine and electric machines or so.

As for said article, an inorganic material such as glass reinforcing material or so may be added to the norbornene polymer constituting thereof, in order to improve the rigidity. However the norbornene polymer has extremely low polarity, thus there was a problem that the adherence with the inorganic material was poor.

In regards with such problems, for example, the patent document 1 proposes a method for obtaining an inorganic filler added polymer article which has improved adhesiveness between the inorganic filler and the polymer by treating the surface of the inorganic filler with the silane coupling agent comprising cyclic olefin group having norbornene structure as the substituent group.

PRIOR ART DOCUMENT

Patent document 1: Japanese Patent Application Laid Open: H02-185558 (U.S. Pat. No. 5,055,499)

SUMMARY OF THE INVENTION

Technical Problems to be Solved by the Invention

The present inventor has tried to produce the inorganic filler added polymer article according to the patent document 1; however it became clear that the fluid composition for reaction injection molding containing relatively large amount of the inorganic filler had high viscosity, thus in some cases the dispersion of the inorganic filler was poor, and the rigidity of the article was low.

The object of the present invention is to provide the surface-coated reinforcing material which does not substantially increase the viscosity of the fluid composition and has good dispersion in case it is blended in the fluid composition for reaction injection molding; and also which can improve the rigidity in regards with the reaction injection molding article.

Other object of the present invention is to provide a fluid composition for reaction injection molding comprising the surface-coated reinforcing material.

Also, the purpose of further other object of the present invention is to provide a production method of the reaction injection molded article used for said surface-coated reinforcing material, and a reaction injection molded article having good rigidity obtained by said production method.

Means for Solving the Technical Problems

As a result of keen examination by the present inventor, he found that the inorganic filler being laminate coated on the surface thereof with two layers of coupling agents in which one layer is a coupling agent layer formed from a silane coupling agent having a hydrocarbon group having a norbornene structure, and the other layer a coupling agent layer formed from a coupling agent other than said silane coupling agent, even when it is blended to a fluid composition of reaction injection molding in relatively large amount, causes substantially no increase in the viscosity of the fluid composition, and can be well dispersed therein; and furthermore, the present inventor found that the rigidity of the obtained reaction injection molded article can be improved. Based on such founding, the present invention was accomplished.

According to the present invention, the following (1) to (9) will be provided.

(1) A surface-coated reinforcing material comprising laminated coating layers on a reinforcing material surface comprising;
one or more of coating layers A comprising a silane coupling agent (I) having at least one hydrocarbon group having a norbornene structure, and
one or more of coating layers B comprising a coupling agent other than the silane coupling agent (I) and/or a fatty acid.

(2) The surface-coated reinforcing material as set forth in (1), wherein said silane coupling agent (I) is a compound shown in a below general formula (Q):

$$R'_g X_p SiR''_h \qquad (Q)$$

(in the formula, each of R' and R" is an arbitrary group which may be the same or different from each other, X is hydrocarbon group having a norbornene structure, each of g and h is an integer of 0 to 3, p is an integer of 1 to 4, and g+h+p=4).

(3) The surface-coated reinforcing material as set forth in (1) or (2) wherein said coating layer B is made of at least one selected from the group consisting of a silane coupling agent other than said silane coupling agent (I), thiol coupling agent, aluminate coupling agent, titanate coupling agent, and fatty acid.

(4) The surface-coated reinforcing material as set forth in any one of (1) to (3), wherein at least one layer of the coating layer A is at within five layers from an outermost layer of the laminated coating layers of the reinforcing material surface, and the five layers includes said outermost layer.

(5) The surface-coated reinforcing material as set forth in any one of (1) to (4), wherein the laminated coating layers of the reinforcing material surface are seven layers or less.

(6) The surface-coated reinforcing material as set forth in any one of (1) to (5), wherein said reinforcing material is an inorganic filler.

(7) A fluid composition for a reaction injection molding comprising a norbornene monomer, a polymerization catalyst, and the surface-coated reinforcing material as set forth in (6).
(8) A production method of the reaction injection molded article comprising the step of bulk polymerizing in a mold the norbornene monomer by polymerization catalyst in the presence of the surface-coated reinforcing material as set forth in any one of (1) to (6).
(9) A reaction injection molded article obtained by the production method of the reaction injection molded article as set forth in (8).

Effects of the Invention

According to the present invention, there can be provided a surface-coated reinforcing material, when used by mixing it in the fluid composition of the reaction injection molding, causing substantially no increase in the viscosity of the fluid composition, being well dispersed therein, and also improving the rigidity in regards with the obtained reaction injection molded article. Also, according to the present invention, there can be provided a fluid composition for a reaction injection molding including said surface-coated reinforcing material having good handling property, and also a reaction injection molded article having good rigidity, particularly having a good bending strength and bending elasticity.

MODES FOR CARRYING OUT THE INVENTION

The surface-coated reinforcing material of the present invention comprises laminated coating layers on a reinforcing material surface comprising one or more coating layers A comprising a silane coupling agent (I) having at least one hydrocarbon group having a norbornene structure, and one or more coating layers B comprising a coupling agent other than the silane coupling agent (I) and/or fatty acid.

In the present description, "laminate coating" refers to coating a reinforcing material surface with a coating layer at the same time as stacking the coating layer on the reinforcing material surface.

Hereinafter, the fluid composition for the reaction injection molding of the present invention will be referred as the fluid composition, and the reaction injection molded article of the present invention will be referred as the article. Also, the silane coupling agent (I) and the coupling agent other than the silane coupling agent (I) may be referred a coupling agent as a whole.

<Reinforcing Material>

The reinforcing material used in the present invention is not particularly limited as long as it is in a solid form. Also, the surface condition of the reinforcing material is not particularly limited, and it does not have to be smooth, flat or non-porous. Further, for example, the surface may be coated in advance with different material than the reinforcing material itself, such as the glass plate coated with the metal or so. The shape of the reinforcing material is not particularly limited, and for example, it may be any of a plate form, a rod form, a cylinder form, a fragment form, a fibrous form, a spherical form, or a particulate form or so. The reinforcing material can be used by appropriately selecting from the known ones according to the purpose of the article to be obtained; however, from the point of improving the handling property thereof, and the rigidity of the article to be obtained, usually, a reinforcing material made of glass, ceramics, metals, carbons, and polymers or so, or the inorganic filler are preferably used. Among these, the inorganic filler is more preferably used. These reinforcing materials can be used alone respectively, or it may be used by combining two or more.

As for the reinforcing material made of glass, for example, a glass plate, glass beads, a glass matt, or glass chips or so may be mentioned. As for the reinforcing material made of ceramics, for example, a ceramic plate or so may be mentioned. As for the reinforcing material made of metal, for example, a metal plate, a metal film and metal pipes made of iron, stainless, aluminum and copper or so may be mentioned. As for the reinforcing material made of carbon, for example, carbon fiber, carbon nanotube, and carbon filler or so may be mentioned. As for the reinforcing material made of polymer, for example, fibrous polymer, resin balloon, and resin filler or so may be mentioned.

As for the inorganic filler, it is not particularly limited, and usually a fibrous filler, or a particulate filler are preferably used.

When the fibrous filler is used as the reinforcing material, the rigidity and the dimensional stability in the obtained article can be improved. The fibrous filler in the present invention refers to the inorganic filler having an aspect ratio of 5 to 100. The aspect ratio is preferably 10 to 50, more preferably 15 to 35. When such aspect ratio is within said range, the obtained fluid composition has good handling property, and the obtained article has sufficient rigidity or the dimensional stability, thus it is preferable.

Note that, the aspect ratio of the filler in the present specification refers to the ratio between the average longitudinal axis diameter of the filler and the 50% volume cumulative diameter (the average longitudinal axis diameter/50% volume cumulative diameter). Here, the longitudinal axis diameter of the 100 arbitrary filler selected were measured by the optical microscope photograph, and an arithmetic average calculated thereof is a number average longitudinal axis diameter. Also, the 50% volume cumulative diameter is obtained by measuring the particle distribution by X-ray transmission method.

The 50% volume cumulative diameter of the fibrous filler is preferably 0.1 to 50 µm, and more preferably 1 to 30 µm. If the 50% volume cumulative diameter is within said range, then the obtained fluid composition has good handling property and the obtained article has sufficient rigidity and the dimensional stability, thus it is preferable.

As for the specific example of the fibrous filler, glass fiber, wollastonite, potassium titanate, xonotlite, basic magnesium sulfate, aluminum borate, tetrapod type zinc oxide, plaster fiber, phosphate fiber, alumina fiber, needlelike calcium carbonate, and needlelike boehmite or so may be mentioned. Among these, the glass fiber and wollastonite is preferable since they can enhance the rigidity of the article even in a small mixing amount and do not interfere the bulk polymerization.

By using the particulate filler as the reinforcing material, the same effect as the fibrous filler can be achieved. The particulate filler in the present invention refers to the inorganic filler having the aspect ratio of 1 to 2. Preferably, the aspect ratio is 1 to 1.5. Also, the 50% volume cumulative diameter of the particulate filler is preferably 0.1 to 50 µm, and more preferably 1 to 30 µm. When such aspect ratio is within said range, the obtained fluid composition has good handling property, and the obtained article has sufficient rigidity or the dimensional stability, thus it is preferable.

As for the specific example of particulate filler, calcium carbonate, calcium silicate, calcium sulfate, aluminum hydroxide, magnesium hydroxide, titanium oxide, zinc oxide, barium titanate, alumina, silica, carbon black, graphite, antimony oxide, red phosphorus, various metal powders, clay, various ferrite, and hydrotalcite or so may be mentioned. These particulate filler may have hollow body. Among these, calcium carbonate, aluminum hydroxide, alumina, and silica or so are preferable since it does not interfere the bulk polymerization.

Above mentioned inorganic filler can be used by alone or by combining two or more of those.

<The Coating Layer A>

The coating layer A in the present invention comprises silane coupling agent (I) having at least one hydrocarbon group having norbornene structure. In the surface-coated reinforcing material of the present invention, the coating layer A may consist of one layer or two or more layers. When the coating layer A consists of two or more layers, the coating layer may be laminated consecutively, or it may be laminated by placing the coating layer B in between. Each layer constituting the coating layer A may be a layer consisting of same coupling agent, or it may be a layer consisting of different coupling agent. Also, each layer may be made of one type coupling agent or it may be a mixture of two or more types of coupling agents. Note that, as long as the desired effect of the present invention is not interfered, as the constituting component of the coating layer A, the coupling agent other than silane coupling agent (I) or a fatty acid may be included, and as for the content thereof, it is 10 wt % or less.

As for the silane coupling agent (I) used in the present invention, it is not particularly limited, and the compound shown in the following formula (Q) is preferably used, since it can efficiently bind with the norbornene monomer by polymerization reaction.

$$R'_g X_p SiR''_h \quad (Q)$$

In the above formula (Q), R' and R'' are an arbitrary group which may be same or different from each other. As for the specific examples of said groups, hydrogen atom, halogen atom such as fluoride atom, chloride atom, and bromine atom or so; an alkyl group having carbon atoms of 1 to 6 such as methyl group, ethyl group, and propyl group or so; an alkoxy group having carbon atoms of 1 to 6 such as methoxy group, ethoxy group, and propoxy group or so may be mentioned; however the halogen atom and the alkoxy group having carbon atoms of 1 to 6 are preferable, and chloride atom, methoxy group, and ethoxy group are more preferable, and methoxy group and ethoxy group are particularly preferable.

In the above mentioned formula (Q), X is a hydrocarbon group having norbornene structure. The total number of entire carbon atoms constituting said hydrocarbon group is preferably 7 to 30, and more preferably 9 to 20. As for suitable hydrocarbon as X, bicycloheptenyl group, and bicycloheptenyl alkyl group or so may be mentioned. Note that, the carbon atoms of alkyl group of the dicycloheptenyl alkyl group are preferably 2 to 8.

In the above mentioned formula (Q), g and h is an integer of 0 to 3, and p is an integer of 1 to 4. Also, g+h+p=4.

As for specific example of the compound shown by said formula (Q) used as the silane coupling agent (I) in the present invention, bicycloheptenyltrimethoxysilane, bicycloheptenylethyltrimethoxysilane, bicycloheptenylhexyltrimethoxysilane, bicycloheptenyltrichlorosilane, bicycloheptenylethyltrichlorosilane, and bicycloheptenylhexyltrichlorosilane or so may be mentioned, however bicycloheptenylethyltrimethoxysilane, bicycloheptenylhexyltrimethoxysilane, are preferable, and bicycloheptenylhexyltrimethoxysilane is more preferable.

The thickness of one layer of the coating layer A is not particularly limited, and usually it is 1 molecule layer to 3 molecules layers or so, and preferably it is 1 molecule layer or so.

<The Coating Layer B>

The coating layer B in the present invention consists of the coupling agent other than the silane coupling agent (I) and/or fatty acid. The coating layer B in the surface-coated reinforcing material of the present invention may be made of one layer or two or more layers. When the coating layer B consists of two or more layers, the coating layer may be laminated consecutively, or it may be laminated by placing the coating layer A inbetween. Each layer constituting the coating layer B may be a layer consisting of same coupling agent and/or fatty acid, or a layer consisting of different coupling agent and/or fatty acid. Also, each layer may be made of one type of coupling agent and/or fatty acid, or two or more types of coupling agents and/or fatty acids. Note that, as long as the desired effect of the present invention is not interfered, the silane coupling agent (I) may be included in the constituting component of the coating layer B, and as for the content thereof, it is 10 wt % or less.

The coupling agent constituting the coating layer B is not particularly limited, as long as it is a known coupling agent other than said silane coupling agent (I). As for said coupling agent, for example, it may be silane coupling agent other than the silane coupling agent (I), thiol coupling agent, aluminate coupling agent, and titanate coupling agent or so may be mentioned.

As for the silane coupling agent other than silane coupling agent (I), for example, vinyltrimethoxysilane, allyltrimethoxysilane, hexyltrimethoxysilane, acrylopropyltrimethoxysilane, and parastyryltrimethoxysilane or so may be mentioned. From a point of view of enhancing the dispersion of the surface-coated reinforcing material of the present invention, vinyltrimethoxysilane, allyltrimethoxysilane, and hexyltrimethoxysilane are preferable, and vinyltrimethoxysilane is more preferable since it can be easily obtained.

As for the thiol coupling agent, for example, triazinethiol and the derivative thereof, and melcaptosilane or so may be mentioned. From the point of view to enhance the dispersion of the surface-coated reinforcing material of the present invention, triazinethiol derivative is preferable. As for the triazinethiol derivative, the compound shown in the below general formula (Z) may be mentioned.

Chemical formula 1

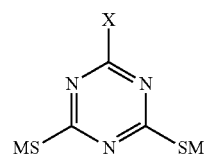

(Z)

In the general formula (Z), X is —$CR^1R^2R^3$, —$NR^4R^5$, —$OR^6$, or —$SR^7$; $R^1$ to $R^7$ is any one of —H, —$C_nH_{2n+1}$ (note that, n is a natural number of 1 to 20), —$C_mH_{2m}CH=CH_2$ (note that, m is a natural number of 1 to 20), —$CH=CH_2$, —$C_8H_{16}CH=CHC_8H_{17}$, —$C_6H_{11}$ (cyclohexyl group), —$C_6H_5$ (phenyl group), —$CH_2C_6H_5$, —$CH_2CH_2C_6H_5$, —$CH_2CH_2OOC(CH_2)_4CH=CH_2$ (note that, "$CH_2OOC$" is ester bonding portion. Same applies to the followings as well.), —$CH_2CH_2COOC(CH_2)_8CH=CH_2$, and —CH$_2$CH$_2$OOC(CH$_2$)$_9$CH=CH$_2$, and R$^1$ to R$^7$ may be same or different, and M is H, Li, Na, K, Ca or Ba.

Among the above mentioned triazinethiol derivative, it is preferably those having X of —NR$^4$R$^5$, R$^4$ of —H, R$^5$ of —C$_m$H$_{2m}$CH=CH$_2$, and M of Na is preferable. As for specific example of such triazinethiol derivative, the compounds shown in following (e) to (g) may be mentioned.

Chemical formula 2

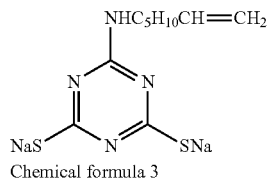

(e)

Chemical formula 3

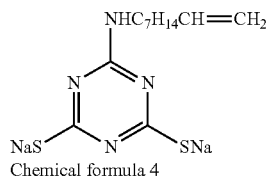

(f)

Chemical formula 4

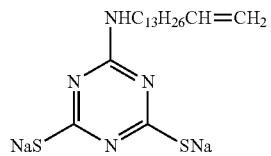

(g)

As for the specific example of aluminate coupling agent, for example, acetoalkoxyaluminiumdiisopropylate or so may be mentioned.

As for the titanate coupling agent, for example, isopropyltrisstearoyl titanate, isopropyltris(dioctylpyrophosphate)titanate, tetraisopropylbis(dioctylpyrophosphite)titanate, tetraoctylbis(ditridecylphosphite)titanate, tetraisopropylbis(ditridecylphosphite)titanate, tetra(2,2-diallyloxymethyl-1-butyl)bis(ditridecyl)phosphite titanate, bis(dioctylpyrophosphate)oxyacetatetitanate, bis(dioctylpyrophosphate)ethylenetitanate, isopropyltrioctanoyltitanate, isopropyltridecylbenzenesulfonyltitanate, isopropyltri(dioctylphosphate)titanate, isopropyldimethacrylisostearoyltitanate, isopropylisostearoyldiacryltitanate, isopropyltricumylphenyltitanate, dicumylphenyloxyacetatetitanate, and diisostearoylethylenetitanate or so may be mentioned. From the point of view of enhancing the dispersion of the surface-coated reinforcing material of the present invention, isopropyltrisstearoyltitanate is preferable.

As for the fatty acid constituting the coating layer B, it is not particularly limited, and for example capric acid, lauric acid, myristic acid, pentadecyl acid, palmitic acid, margaric acid, stearic acid, tuberculostearic acid, and arachidinic acid or so may be mentioned. From the point of view of enhancing the dispersion of the present invention, the stearic acid is preferable.

As the constituting component of the coating layer B, considering the balance between the enhancement of the dispersion of the surface-coated reinforcing material of the present invention and the enhancement of the rigidity of the obtained article, at least one selected from the group consisting of silane coupling agent other than coupling agent (I), thiol coupling agent, aluminate coupling agent, titanate coupling agent, and fatty acid are used.

The thickness of one layer of the coating layer B is not particularly limited, however usually it is 1 molecule layer to 30 molecules layer or so, and preferably 5 molecules layer to 20 molecules layer or so.

<The Surface-Coated Reinforcing Material>

The surface-coated reinforcing material of the present invention comprises laminated coating layers comprising one or more of each said coating layer A and said coating layer B on a reinforcing material surface.

The surface-coated reinforcing material of the present invention is formed by, for example, laminate coating a given coating layer to the reinforcing material surface by following the below layer forming method.

Note that, as long as the desired effect of the present invention is not interfered, the surface-coated reinforcing material of the present invention may comprise other materials other than the coupling agent or the fatty acid used in the present invention, for example the layer consisting of reactive inorganic compound such as silicone tetrachloride or alkylaluminum or so may be included in the laminated coating layer. Also, as long as the desired effect of the present invention is not interfered, the position of said layer is not particularly limited.

Hereinafter, the material for laminate coating the reinforcing surface will be referred as "coating material", and the reinforcing material or the reinforcing material having the coating layer on the surface will be referred as "coating object".

In the case that the used reinforcing material is for example, plate form, rod form, cylinder form, fragment form, or fibrous form, a coating material fluid is obtained by dissolving a coating material into an arbitrary solvent such as ethanol or so, and the coating material fluid is applied on the surface of a coating object by known applying method such as spray coat method, dip coat method, roll coat method, curtain coat method, die coat method, slit coat method or so; or a coating object is immersed in the coating material fluid; or a coating object is impregnated with the coating material fluid; then the drying step is carried out. By repeating the above steps suitably, the surface-coated reinforcing material of the present invention can be produced.

On the other hand, when the used reinforcing material is spherical form or particulate form, by repeating the following layer forming method, the surface-coated reinforcing material of the present invention can be produced.

For example, (i) the method of putting a coating object and coating material together, then dry stirring the resultant mixture, or (ii) the method of dry stirring a coating object with a coating material being added thereto, then further dry stirring the resultant mixture may be mentioned. In the above mentioned (i) or (ii) method, when one type of the used reinforcing material is used, said reinforcing material may be used at once; and when two or more are used, all of the reinforcing materials may be used at once; and then the method may be carried out. Also, when two or more reinforcing materials are used, (iii) the method of separately adding a coating material to two or more coating objects, then dry stirring each of those, combing each coating object, and further dry stirring the resultant mixture may be used. Among these, the method of (ii) is preferable, and in order to uniformly disperse a coating material to a coating object, when the coating material is added, it is preferable to be added gradually by spraying or so.

Hereinafter, the production method of the surface-coated reinforcing material of the present invention will be specifically described according to the layer forming method of the above mentioned (ii), taking as an example the surface-coated inorganic filler which is made by respectively laminate coating on the surface of the inorganic filler, a coating layer B1 corresponding to the coating layer B as the first layer, the coating layer A as the second layer, and a coating layer B2 corresponding to the coating layer B as the third layer, wherein the inorganic filler is used as the reinforcing material. Note that, coupling agent 1 and 2 are coupling agents other than the silane coupling agent (I).

(The Formation of the First Layer)

The inorganic filler is introduced into the mixer and stirred. The inorganic filler may be the fibrous filler only, the particulate filler only, or it may be both of the fibrous filler and the particulate filler. Also, other known inorganic filler may be further used.

The temperature of the tank of the mixer is usually 0 to 40° C., and preferably 20 to 30° C. The blade tip speed of the mixer is usually 10 to 50 m/s, and preferably 20 to 40 m/s. The stirring time of the mixer is usually 30 seconds to 5 minutes, and preferably 1 to 3 minutes.

Next, a desired coupling agent 1 for forming the coating layer B1 is spray added into the mixer. The spray of the coating material may be carried out once, or it may be carried out by separating into several times. Also, it may be carried out while stirring the mixer or it may be carried out by stopping the mixer once. The spray amount of the coupling agent 1 with respect to the inorganic filler is not particularly limited; however it is usually 0.05 to 5 parts by weight, and preferably 0.1 to 3 parts by weight with respect to 100 parts by weight of the inorganic filler.

After finishing the spraying, and after finishing the further stirring according to the above mentioned stirring condition, the inorganic filler is transferred to the incubator, and usually it is dried at 100 to 130° C., preferably at 110 to 120° C., for 30 to 120 minutes, preferably for 60 to 90 minutes (the drying step), thereby the inorganic filler having the coating layer B1 on the surface is obtained. The obtained inorganic filler may be used at the next step without cooling down, however usually it is preferably used by cooling down to the temperature range of 0 to 40° C., preferably 20 to 30° C. (the cooling step).

(The Formation of the Second Layer)

The inorganic filler having the coating layer B1 on the surface thereof is introduced into the mixer, and as similar to the above, the silane coupling agent (I) is spray added into the mixer.

After the spraying is finished, it is stirred as similar to the above, the inorganic filler is transferred to the incubator and dried, thereby the inorganic filler having the coating layer A on the surface of the coating layer B1 is obtained. The obtained inorganic filler may be used to the next step without cooling down, however it is preferably used after dried and cooled.

(The Formation of the Third Layer)

The coating layer B2 of the third layer is formed on the surface of the coating layer A using a coupling agent 2 as the same as the coating layer A of the second layer. Thereby, the surface-coated inorganic filler of which laminated coating layer on the inorganic filler surface comprises the coating layer B1 as the first layer, the coating layer A as the second layer, and the coating layer B2 as the third layer can be obtained.

In the production of the surface-coated reinforcing material of the present invention, as mentioned in the above, it is preferable to carry out the drying step and the cooling step to the reinforcing material having the coating layer each time forming the each layer on the surface of the reinforcing material or the coating layer. Thereby, the material constituting each layer is distributed uniformly, and the layer having uniform thickness can be obtained, thus it is suitable.

As described hereinabove, the surface-coated reinforcing material of the present invention formed by laminate coating the coating layer A and the coating layer B on the reinforcing material surface can be produced. As for the layer structure covering the surface of the reinforcing material, it is not particularly limited as long as it is a laminate coating layer comprising one or more of the coating layer A and one or more of the coating layer B. Also, at said layer structure, as long as the effect of the present invention is not interfered, the coating layer formed by the material other than the coupling agent or the fatty acid used in the present invention may be used. In case of using the surface-coated reinforcing material of the present invention for the preparation of the fluid composition, the viscosity of said fluid composition substantially does not increase and good dispersion can be obtained even when said reinforcing material is blended relatively a lot. Also, in regards with the obtained article, from the point of view of enhancing the rigidity, at least one layer of the coating layer A in the surface-coated reinforcing material of the present invention is preferably formed at within 5 layers preferably, within 3 layers, and most preferably within 2 layers from the outermost layer (the layer furthest from the reinforcing material surface) of the laminated coating layer of the reinforcing material surface, including said outermost layer. Also, in the surface-coated reinforcing material of the present invention, as the total number of the coating layers constituting the laminated coating layer of the reinforcing material surface is usually 7 layers or less, preferably 5 layers of less, and more preferably 3 layers or less. The lower limit of said total number is 2.

Although the detailed mechanism in regards with effect of the surface-coated reinforcing material of the present invention is not clear; the reinforcing material surface, the silane coupling agent (I), and the coupling agent other than the silane coupling agent (I) and the fatty acid may react with each other, thereby exhibiting a good dispersion when using the surface-coated reinforcing material of the present invention for the preparation of fluid composition, and on the other hand, in regards with the article obtained by using the surface-coated reinforcing material of the present invention, it is speculated that the adhesiveness between the reinforcing material and the polymers which the silane coupling agent (I) has is improved synergistically.

The average particle diameter of the surface-coated reinforcing material of the present invention is not particularly limited, and usually it is 0.5 to 50 μm, and preferably 1 to 20 μm. Said average particle diameter is for example, measured by the laser diffraction method.

In the surface-coated reinforcing material of the present invention, the coating degree to the reinforcing material surface or the coating layer by a coating material does not have to be complete as long as the desired effect of the present invention can be obtained. As for the degree of the coating, when the surface area of the reinforcing material or the coating material layer which is the object to be coated by the coating material is 100%, usually it may be 10% or more, and preferably 50% or more. The degree of the coating can be, for example, obtained by JIS Z 8830 "Determination of the specific surface area of powders (solids) by gas adsorption method".

<The Fluid Composition>

The fluid composition of the present invention comprises the norbornene monomer, the polymerization catalyst, and the surface-coated reinforcing material. In said fluid composition, the reinforcing material constituting the surface-coated reinforcing material used is the inorganic filler.

The fluid composition of the present invention is usually prepared by preparing two or more preliminary fluid composition, and made to a polymerization reactive fluid composition by mixing these preliminary fluid compositions right before carrying out the reaction injection molding. Each of the preliminary fluid composition is not polymerization active by itself. It may be prepared by suitably selecting the composition so that it becomes polymerization active by mixing these.

The norbornene monomer used in the present invention is a cyclic olefin monomer having a norbornene cyclic structure in the molecule, and it is not particularly limited. Among these, polycyclic norbornene monomer of bicyclic or more is preferably used, since an article having good heat resistance can be obtained.

As for the norbornene monomer, bicyclics such as norbornene or norbornadiene or so; tricyclics such as dicyclopentadiene (a dimer of the cyclopentadiene), dihydrodicyclopentadiene or so; tetracyclics such as tetracyclododecene or so; pentacyclics such as cyclopentadiene trimers or so; septacyclics such as cyclopentadienetetramers or so; may be mentioned.

These norbornene monomer may comprise the substituent group such as; alkyl group having carbon atoms of 1 to 8 such as methyl group, ethyl group, propyl group and butyl group or so; alkenyl group having carbon atoms of 2 to 8 such as vinyl group or so; alkylidene group having carbon atoms of 2 to 8 such as ethylidene group or so; aryl group having carbon atoms of 6 to 10 such as phenyl group, tolyl group and naphtyl group or so. Also, these norbornene monomer may comprise a polarity group such as ester bonding (—C(=O)O—) containing group, ether bonding (—O—) containing group, cyano group, and halogen atoms or so.

As for specific examples of the norbornene monomer, tricyclodiene, cyclopentadiene-methylcyclopentadiene codimer, 5-ethylidenenorbornene, 5-cyclohexenylnorbornene, 1,4,5,8-dimethano-1,4,4a,5,6,7,8,8a-octahydronaphtalene, 1,4-methano-1,4,4a,5,6,7,8,8a-octahydronaphtalene, 6-ethylidene-1,4,5,8-dimethano-1,4,4a,5,6,7,8,8a-octahydronaphtalene, 6-ethylidene-1,4-methano-1,4,4a,5,6,7,8,8a-octahydronaphtalene, 1,4,5,8-dimethano-1,4,4a,5,6,7,8,8a-hexahydronaphtalene, and ethylenebiss(5-norbornene) or so may be mentioned.

The norbornene monomer may be used by only one type, or it may be combined with two or more types.

Among the above mentioned norbornene monomers, the norbornene monomer of bicyclic, tricyclic, tetracyclic, or pentacyclic are preferable since it is easy to obtain, and has good reactivity, further the obtained article has good heat resistance.

Also, it is preferable that the polymer being formed has a heat curing property. In order for that, as for the above mentioned norbornene monomer, those at least having the crosslinking monomer having two or more of reactive double bonds such as symmetric cyclopentadiene trimers or so is used. The content of the crosslinking monomer in the entire norbornene monomer is usually, preferably 2 to 30 wt %.

Note that within the range which does not interrupt the object of the present invention, for example the monocyclic olefinmonomer or so such as cyclobutene, cyclopentene, cyclopentadiene, cyclooctene, and cyclododecene or so which are capable to copolymerize with the norbornene monomer may be used as the comonomer.

As for the polymerization catalyst used in the present invention, metathesis polymerization catalyst is preferable since it has good productivity of the article. The metathesis polymerization catalyst is not particularly limited, and it only needs to be the catalyst which can carry out the ring opening polymerization to the norbornene monomer.

The metathesis polymerization catalyst is a complex which has a transition metal atom as a center metal atom and a plurality of ions, atoms, polyatomic ions and/or compounds are bonded. As for the transition metal atom, the atoms of group 5, 6, and 8 (long-period type periodic table, same for hereinafter as well). The atoms of each group is not particularly limited, as for the atom of group 5, for example tantalum is mentioned; as for the atom of group 6, for example molybdenum or tungsten may be mentioned; and for the atom of group 8, for example, ruthenium or osmium may be mentioned.

For example, as for the metathesis polymerization catalyst having the tungsten or molybdenum of group 6 as the center metal atom, for example, metal halogen compound such as tungsten hexachloride or so; metal oxyhalogen compound such as tungsten chlorate oxide compound or so; metal oxides such as tungsten oxides or so; organic oxytungstenhalide; and organometal ammonium salts such as tridodecylammonium molybdate or tri(tridecyl)ammoniummolybdate or so; and particularly organic molybdate ammonium salts or so may be mentioned. Among these, organicoxy tungsten halide and organicmolybdate ammonium salts are preferable.

As the metathesis polymerization catalyst, among the above mentioned, it is preferable to use the metal carbene complex having the atoms of group 5, 6, and 8 as the center metal atoms. Among the metal carbene complex, the carbene complex of ruthenium or osmium of group 8 are preferable, and ruthenium carbene complex is more preferable. The ruthenium carbene complex is suitable since it has high catalyst activity during the bulk polymerization, and has good productivity of the article using the norbornene monomer, further the obtained article has little smell from the unreacted norbornene monomer.

Among the ruthenium complex, the ruthenium complex having at least two carbene carbons bonded with the ruthenium atom, and in at least one of said carbene complex directly bonded with the hetero atom is preferable. "hetero atom" in the present specification refers to the atoms of group 15 and 16 of the periodic table. As for the specific example of hetero atoms, nitrogen atom, oxygen atom, phosphorous atom, sulfur atom, arsenic atom, and selenium atom or so may be mentioned. Among these, nitrogen atom, oxygen atom, phosphorous atom, and sulfur atom are preferable, and particularly phosphorous atom and nitrogen atom are preferable since a stable carbene complex can be obtained.

As for the specific example of said ruthenium carbene complex, the complexes shown by the following formula (1) or formula (2) may be mentioned.

Chemical formula 5

(1)

(2)

In the formula (1) and (2), $R^{10}$ and $R^{20}$ are independent from each other, and show hydrogen atom; halogen atom; or hydrocarbon group having carbon atoms of 1 to 20 having cyclic form or chain form, which may include halogen atom, oxygen atom, nitrogen atom, sulfur atom, phosphorous atom or silicon atom. $X^1$ and $X^2$ are independent from each other, and shows arbitrary anionic ligand. $L^1$ and $L^2$ are independent from each other and show heteroatom containing carbene compound or neutral electron-donating compound other than the heteroatom containing carbene compound. Also, $R^{10}$ and $R^{20}$ may bond with each other and may form a ring with or without the hetero atom. Further, $R^{10}$, $R^{20}$, $X^1$, $X^2$, $L^1$ and $L^2$ L may bond with each other in an arbitrary combination and may form a multi-site chelate ligand.

As for said heteroatom containing carbene compound, the compounds shown in the following formula (3) and (4) may be mentioned.

Chemical formula 6

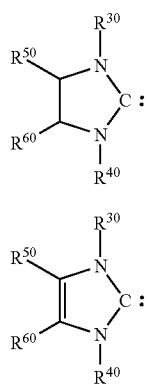

(3)

(4)

In the formula (3) and (4), $R^{30}$, $R^{40}$, $R^{50}$, and $R^{60}$ are independent from each other, and show hydrogen atom; halogen atom; or hydrocarbon group having carbon atoms of 1 to 20 having cyclic form or chain form, which may include halogen atom, oxygen atom, nitrogen atom, sulfur atom, phosphorous atom or silicon atom. $R^{30}$, $R^{40}$, $R^{50}$, and $R^{60}$ may form a ring by bonding with each other in an arbitrary combination.

In the above formula (1) and (2), anionic (negative ion) ligand refers to the ligand having negative electrical charge when separated from the center metal atom. Also, the neutral electron-donating compound refers to ligand having neural electrical charge when separated from the center metal atom.

The used amount of the metathesis polymerization catalyst, with respect to 1 mol of the norbornene monomer used for the reaction, is usually 0.01 mmol or more, and preferably 0.1 mmol or more and 50 mmol or less, preferably 20 mmol or less. If the used amount of the metathesis polymerization catalyst is too small, the polymerization activity is too low and it takes too much time to carry out the reaction, hence the production efficiency declines; on the other hand, if the used amount is too much, the reaction is too extreme that during the reaction injection molding, it may start to cure before the fluid composition is sufficiently filled into the mold, or it tends to become difficult to store the fluid composition in an uniform quality since the catalyst becomes easily precipitate.

In order to control the polymerization activity, the activator (cocatalyst) may be used together with the metathesis polymerization catalyst. The activator is not particularly limited, and for example, the organometalic compound including the atoms of group 11 to 14 of the periodic table may be mentioned. As for the specific example, organic aluminum compound such as alkylaluminiumhalide such as ehtylaluminum dichloride and diehtylaluminumchloride or so, and alkoxy-alkylaluminum halide or so; organic tin compound such as tetrabutyltin or so; orgnic zinc compound such as diethylzinc or so may be mentioned. When using organic oxytungstenhalide or organic molybdate ammonium salts as the metathesis polymerization catalyst, it is preferable to use with the activator listed as the specific examples. On the other hand, when using rutheniumcarbene complex as the metathesis polymerization catalyst, the activator may or may not be used.

The used amount of the activator is not particularly limited, however it is 0.1 mol or more, preferably 1 mol or more, and 100 mol or less, preferably 10 mol or less with respect to 1 mol of the metathesis polymerization catalyst used in the reaction. When the activator is not used or if the used amount of the activator is too little, the polymerization activity is too low and it takes too much time to carry out the reaction, hence the production efficiency declines; on the other hand, if the used amount is too much, the reaction is too extreme that during the reaction injection molding, it may start to cure before the fluid composition is sufficiently filled into the mold.

The activator is usually used by dissolving in the monomer; however as long as the quality of the article made by the reaction injection molding method is not substantially interfered, the activator may be used by suspending in the small amount of the solvent and mixed with the monomer so that it becomes less likely to precipitate and to increase the solubility.

Note that, the activator is usually not added in the preliminary fluid composition containing the metathesis polymerization catalyst, and it is preferable to use by preparing a separate preliminary fluid composition containing the norbornene monomer and the activator.

Also, the activity regulator may be used. When the preliminary fluid composition containing the polymerization catalyst which will be described in bellow and the preliminary fluid composition containing activator are mixed and introduced into the mold as the polymerization reactive fluid composition, the activity regulator prevents the polymerization from starting in the middle of introduction.

As for such activity regulator, Lewis base such as ether, ester, and nitrile, acetylene group and α-olefin group are preferably used. Specifically, as for the Lewis base, butylether, ethyl benzoate, and diglyme or so may be mentioned. Also, as for the acetylene group, phenylacetylene or so; and as for the α-olefin group, vinylnorbornene or so may be mentioned. Also, on the other hand, when using the polar group containing monomer as for the copolymerizing monomer, said monomer itself may be the Lewis base, and may have the function as the activity regulator as well. The activity regulator is preferably added with the preliminary fluid composition containing the activator. Also, as for the activity regulator, an alcohol may be used suitably as well.

Furthermore, in order to improve the polymerization conversion rate of the monomer, the polymerization promoter is preferably used. As for the polymerization promoter, chlorine atom containing compound is preferable, and among these, organochlorine compound and chlorinated silicon compound are preferable. As specific example thereof, 2,4-dichlorobenzotrichloride, hexachloro-p-xylene, 2,4-dichloro-trichlorotoluene, and silicon tetrachloride or so may be mentioned.

The added amount of above mentioned activity regulator and the polymerization promoter is not particularly limited, and it is approximately 10 wtppm to 10 wt % in the fluid composition of the present invention.

As for the mixing amount of the surface-coated reinforcing material of the present invention in the fluid composition of the present invention, usually 5 to 900 parts by weight is preferable, and 10 to 400 parts by weight is more preferable with respect to 100 parts by weight of the norbornene monomer.

If the surface-coated reinforcing material is too much in the fluid composition of the present invention, said reinforcing material may precipitate in the tank or the pipe when introducing the fluid composition into the molding, or the introduction nozzle tends to be clogged. On the contrary, if it is too little, the rigidity or the dimensional stability of the obtained article tends to become insufficient.

The fluid composition of the present invention preferably contains the elastomer having a shear speed coefficient of 1.3 to 1.6, preferably 1.5 to 1.6 or so. By mixing such elastomer, the fluid composition having good fluidity can be obtained, and by using this, the article having little depression can be obtained. The shear speed of the elastomer can be measured by the method described in Japanese Patent Application Laid Open No. 2008-163105.

As for the specific examples of elastomer, natural rubber, polybutadiene, polyisoprene, styrene-butadiene copolymer (SBR), styrene-butadiene-styrene block copolymer (SBS), styrene-isoprene-styrene copolymer (SIS), ethylene-propylene copolymer, ethylene-propylene-diene terpolymer (EPDM), ethylene-vinyl acetate copolymer (EVA), and the hydride thereof may be mentioned.

In the present invention, the elastomer is preferably olefin type elastomer, and more preferably it is ethylene-propylene copolymer and ethylene-propylene-diene terpolymer (EPDM). As for ethylene-propylene copolymer, those having 5 to 50 wt % of ethylene unit, and 50 to 95 wt % of propylene unit are particularly preferable. As for ethylene-propylene-diene terpolymer, those having 5 to 50 wt % of ethylene unit, 50 to 95 wt % of propylene unit, and 0 to 10 wt % of diene monomer are particularly preferable.

Also, in the present invention, the elastomer preferable has the Mooney viscosity of 5 to 100. When the Mooney viscosity of the elastomer is higher than the above range, the molecular chain of the elastomer is cut while the fluid composition circulates the reaction injection molding machine, and the physical property of the obtained article declines; and when the Mooney viscosity is below the above range, not only the elastomer completely dissolves in the article and deteriorate the shock-resistance, but also the heat resistance also declines as well.

In the fluid composition of the present invention, as for the mixing amount of the elastomer, 0.5 to 20 parts by weight is preferable and 2 to 10 parts by weight is more preferable with respect to 100 parts by weight of the norbornene monomer. When the mixing amount of the elastomer is within said range, the fluid composition of the present invention has good fluidity, and article having little depression can be obtained, thus it is suitable.

In the present invention, various additives may be further mixed in the fluid composition for the improvement or for maintaining the property of the obtained article. As for such additives, a reinforcing agent, an antioxidant, a thermal stabilizer, a photostabilizer, an ultraviolet ray absorbent, a pigment, a coloring, a foaming agent, an anti-static agent, a flame retardant, a lubricant, a softener, a tackifier, a plasticizer, a parting agent, a deodorant, an incense, dicyclopentadiene thermal polymerizing resin and the hydrogenated compounds thereof may be mentioned.

Various additives are added to the fluid composition of the present invention by the method of first adding to the preliminary fluid composition containing the polymerization catalyst, then mixing with the preliminary fluid composition containing the monomer when carrying out the reaction injection molding; the method of first adding to the preliminary fluid composition containing the monomer, then mixing with the preliminary fluid composition containing the polymerization catalyst when carrying out the reaction injection molding; or the method of filling it into the mold in advance or so. The method of addition may be suitably selected depending on the type of the additives.

The preparation method of the fluid composition of the present invention is not particularly limited, however typically there are two methods as shown in below depending on whether the polymerization catalyst needs the activator or not.

If the polymerization catalyst does not need the activator, the preliminary fluid composition containing the norbornene monomer (hereinafter, it is referred as "a solution"), and the preliminary fluid composition prepared by dissolving or dispersing the polymerization catalyst in small amount of the non-active solvent (hereinafter, it is referred as "b solution"), are mixed and the fluid composition of the present invention can be prepared.

In this case, the surface-coated reinforcing material may be contained in either of "a solution" and "b solution", however it is preferable to be contained in the "a solution" which contains the norbornene monomer.

Note that, the surface-coated reinforcing material of the present invention may be used by only one type, or two or more of those prepared by using different inorganic fillers, or two or more of those having same inorganic filler but has different coating materials or layer structures of the coating material formed on the surface of the inorganic filler, may be used together. For example, when using the surface-coated reinforcing material of which the inorganic filler used is the fibrous filler, and the surface-coated reinforcing material of which the used inorganic filler is the particulate filler for the preparation of the fluid composition of the present invention, these may be mixed into each separate preliminary fluid composition, or both may be mixed into the same preliminary fluid composition. The latter mixing method is preferable from the point of suppressing the precipitation of the surface-coated reinforcing material of the present invention, and of maintaining the storing stability of the preliminary fluid composition in good condition.

On the other hand, if the polymerization catalyst needs the activator, the preliminary fluid composition containing the norbornene monomer and the activator (hereinafter, it will be referred "A solution"), and the preliminary fluid composition containing the norbornene monomer and the polymerization catalyst (hereinafter, it will be referred as "B solution") are prepared, and mixed; thereby the fluid composition of the present invention may be prepared. At this time, the preliminary fluid composition containing only the norbornene monomer (hereinafter, it may be referred as "C solution") may be used together.

In this case, the surface-coated reinforcing material of the present invention may be contained in any one of "A solution", "B solution" and "C solution"; however it is preferably contained in "C solution". The surface-coated reinforcing material of the present invention may be used by only one type or combination of two or more types different from each other, as similar to the case that the polymerization catalyst does not need the activator. When using the combination of two or more types different from each other, it is preferable to mix both of the surface-coated reinforcing material in the same preliminary fluid composition from the point of suppressing the precipitation of the surface-coated reinforcing material of the present invention, and of maintaining the storing stability of the preliminary fluid composition in good condition.

When mixing the elastomer in the fluid composition of the present invention, the elastomer may be mixed in any of the preliminary fluid compositions ("a solution" or "b solution", or "A solution", "B solution", or "C solution"); however it is preferably mixed in the preliminary fluid composition comprising the norbornene monomer.

The fluid composition of the present invention is obtained by appropriately mixing the above mentioned preliminary fluid compositions following the below methods.

<The Production Method of the Article>

The production method of the article of the present invention comprises the step of bulk polymerizing the norbornene monomer in the mold using polymerization catalyst in the presence of the surface-coated reinforcing material of the present invention.

The performance of said step is for example carried out by using the reaction injection molding (RIM) equipped with the collisional mixing machine. That is, two or more of the preliminary fluid composition are separately introduced into the collisional mixing machine, and instantaneously mixed by the mixing head; then the obtained polymerization reaction solution is introduced into the mold to carry out the bulk polymerization in this mold; thereby the article of the present invention is obtained. Note that, instead of the collisional mixing machine, low pressure injection machine such as a dynamic mixer or a static mixer can be used as well.

When the reinforcing material constituting the surface-coated reinforcing material to be used is the inorganic filler, the above mentioned "a solution" or "b solution"; or "A solution", "B solution" or "C solution" may be used as the preliminary fluid composition. The preliminary fluid compositions are mixed in said mixing head, and become the fluid composition of the present invention. In this case, in the mold introduced with the fluid compositions, the norbornene monomer will be bulk polymerized by the polymerization catalyst in the presence of the surface-coated reinforcing material. On the other hand, when the reinforcing material constituting the surface-coated reinforcing material to be used is other than the inorganic filler, the preliminary fluid compositions are prepared and used as the same as the case when the reinforcing material is the inorganic filler, except for not adding the surface-coated reinforcing material to them. The preliminary fluid compositions are mixed in said mixing head, and become the polymerization reaction solution not containing the surface-coated reinforcing material. In this case, as for the reinforcing material constituting the surface-coated reinforcing material, for example, glass plate, metal foil, resin film, or fibrous material or so may be mentioned. The surface-coated reinforcing material made by using such reinforcing material is placed in advance in the mold. When the polymerization reaction solution is introduced into said mold, the norbornene monomer can be bulk polymerized by the polymerization catalyst in the presence of the surface-coated reinforcing material inside said mold.

The temperature of the polymerization reaction solution before using it in the reaction injection molding (it includes the fluid composition of the present invention. Hereinafter, it is the same) is preferably usually 10 to 60° C., and the viscosity at 30° C. is usually 5 to 3,000 mPa·s, and preferably 50 to 1,000 mPa·s.

As for the material of the mold used for the reaction injection molding is not particularly limited, however the metals such as steel, aluminum, zinc alloy, nickel, copper, and chromium or so are preferable. The mold may be produced by any of the method of casting, forging, thermal spraying, and electrocasting or so, and also it may be plated as well.

The structure of the mold may be determined by taking into account of the pressure when introducing the polymerization reaction solution into the mold. The clamping pressure of the mold is usually 0.1 to 9.8 MPa in a gage pressure.

The molding time is not uniform since it changes depending on the type of norbornene monomer, polymerization catalyst, and activator, the compositional ratio thereof, and the mold temperature; however generally it is 5 seconds to 6 minutes, and preferably it is 10 seconds to 5 minutes.

As for the mold being used, it is preferable to use the split mold structure, which is the mold comprising the core mold and the cavity mold. The core mold and the cavity mold are produced so that the opening area is formed which fits the article of the object. When the bulk polymerization is carried out by introducing the polymerization reaction solution into the cavity formed by the core mold and the cavity mold, generally, it is preferable that the mold temperature $T1(° C.)$ of the design surface side of the mold is set higher than the mold temperature $T2(° C.)$ of the side of mold corresponding to the design surface. Thereby, the surface exterior of the article can be made beautiful without the depression or air.

$T1-T2$, has the lower limit of preferably 5° C. or higher, more preferably of 10° C. or higher, and the upper limit of 60° C. or less. T1 preferably has an upper limit of 110° C. or less, more preferably 95° C. or less; and lower limit of preferably 50° C. or higher. T2 preferably has upper limit of 70° C. or less, more preferably 60° C. or less; and lower limit of preferably 30° C. or higher.

As for the method to regulate the mold temperature, for example, the regulation of the mold temperature by using the heater; the regulation of the mold temperature by using the heating medium such as warm water or oil or so which circulates in the pipe embedded in the mold; or so may be mentioned.

After finishing the bulk polymerization, the mold is opened and removed from the mold, thereby the article of the present invention can be obtained. Said article has good rigidity, bending strength, and particularly bending elasticity. The article of the present invention is suitably used for example in, the body parts of the automobile or construction/agriculture machine, the outer wall or the ceiling, the housing material such as floor or so, the sealing material or a heat dissipation of the electric/electronic components or so.

EXAMPLE

Hereinbelow, the present invention will be described in further detail using the examples, however the present invention is not to be limited thereto. "parts" and "%" in the following is based on weight unless mentioned otherwise.

Also, each characteristic was measured by the method shown in the following.

(1) The Viscosity of the Fluid Composition

The fluid composition is prepared by mixing the preliminary fluid composition X including the norbornene monomer and the surface-coated inorganic filler, and the preliminary fluid composition Y including the polymerization catalyst; however the mixing amount of the preliminary fluid composition Y is very little, so at immediately after the mixing (within about two minutes), there is no substantial influence to the viscosity of the preliminary fluid composition X, thus the viscosity of the fluid composition X is substantially equal to the viscosity of the fluid composition immediately after the preparation. Thus, in the examples and the comparative examples, the viscosity of the preliminary fluid composition X was measured and considered as the viscosity of the fluid composition.

Note that, the viscosity of the preliminary fluid composition X was measured, under the solution temperature of 30° C., after one minute mixing by using the type B viscometer with No. 23 rotor at the rotation speed of 60 rpm.

(2) The Bending Strength

The bending strength of the article was measured according to JIS K 7171. Regarding the standard deviation σ, first, the arithmetic mean of the measured data was obtained, and the total sum of the square of the value obtained by deducting the arithmetic mean from each measured data was obtained; then the unbiased variance ($\sigma'^2$) was obtained by dividing said total sum with the value deducting 1 from the number of the measured data, thereby the standard deviation σ was determined as the positive square root of said unbiased variance.

(3) The Bending Elasticity

The bending elasticity of the present invention was measured according to JIS K 7171. The standard deviation σ was obtained as the same as said bending strength.

The components used in the article production of the examples and the comparative examples are shown in below.

<Silane Coupling Agent>
bicycloheptenyltriethoxy silane (hereinafter, it will be referred as NrSi)
bicycloheptenylethyltriethoxy silane (hereinafter, it will be referred as NrC2Si)
bicycloheptenylhexyltriethoxy silane (hereinafter, it will be referred as NrC6Si)

<The Titanate Coupling Agent>
isopropyltrisstearoyltitanate (hereinafter, it will be referred as TTS)

<The coupling agent other than said coupling agent>
vinylsilane (hereinafter, it will be referred as VSi)

<The Inorganic Filler>
the particulate filler (aluminum hydroxide; 50% volume cumulative diameter: 12 μm, aspect ratio: 1)

Hereinafter the inorganic filler comprising the coupling agent on its surface will be referred as post-treatment filler.

Example 1

(The Preparation of the Surface-Coated Inorganic Filler)

100 parts of the particulate filler was introduced into the 1 L of the henschel mixer, and mixed at the tank temperature of 20° C. and the speed of blade tip speed of 20 m/s. Next, 0.5 parts of VSi was added into the mixer by spraying, then after finishing the spraying, the resultant mixture was mixed for 1 minute at the blade tip speed of 20 m/s. Then, the post-treated filler was transferred to the inert oven, and was dried at 110° C. for 1 hour then cooled down to 20° C.

Next, the cooled post-treated filler obtained in the above was introduced into the mixer, and 0.5 parts of NrC2Si was added by spraying, then after spraying is finished, the resultant mixture was mixed for 1 minute at the blade tip speed of 20 m/s. Then, the post-treated filler was transferred to the inert oven, and was dried at 110° C. for 1 hour then cooled down to 20° C.

Next, 0.5 parts of TTS was added into the mixer by spraying. After finishing the spraying, the resultant mixture was mixed for 1 minute at the blade tip speed of 20 m/s. Then, the post-treated filler was transferred to the inert oven, and was dried at 110° C. for 1 hour then cooled down to 20° C., thereby the surface-coated inorganic filler laminate coated with three layers of the coupling agents on the surface of the particulate filler can be obtained.

(The Preparation of the Preliminary Fluid Composition X)

257 parts of the surface-coated inorganic filler produced in the above, was added to the mixed monomer consisting of 90 parts of dicyclopentadiene and 10 parts of tricyclopentadiene, then the resultant mixture was shear dispersed using the homogenizer under the condition of the rotational speed of 13500 rpm for 1 minute; thereby the preliminary fluid composition X comprising the norbornene monomer, and the surface-coated inorganic filler was prepared. In regards to the obtained preliminary fluid composition X, the viscosity was measured by the above mentioned method.

(The Preparation of the Preliminary Fluid Composition Y)

Separately from the above, the preliminary fluid composition Y was obtained by dissolving 1.7 parts of ruthenium carbon complex as the metathesis polymerization catalyst in 100 parts of toluene.

(The Preparation of the Article)

A pair of the reaction injection molding mold comprising at its inside a space (cavity) of a box shape having length 250 mm×width 200 mm×thickness 3 mm was provided. One side of the mold was heated to 90° C. and the other side was heated to 60° C. Note that, this reaction injection molding mold has a structure comprising a reaction fluid injecting hole at the bottom portion of one side of the mold.

Next, 100 parts of the preliminary fluid composition X and 0.45 parts of the preliminary fluid composition Y were mixed, and filled into the simple injection container of the piston style after obtaining the fluid composition by sufficiently mixing, then the fluid composition was introduced into the reaction injection molding mold at the injection pressure of 0.3 Mpa. It was cured for 120 seconds after the injection, then after the article had been taken out; it was heated for 1 hour in the inert oven at 120° C. The bending strength and the bending elasticity of the obtained article were measured according to the above method.

Example 2, 3

The surface-coated inorganic filler was obtained as the same as the example 1, except for using NrC6Si layer in the example 2 and NrSi layer in the example 3, instead of NrC2Si layer of the second layer in the surface-coated inorganic filler obtained of the example 1. Also, except for using said fillers, the viscosity of the preliminary fluid compositions were measured as the same as the example 1, and the article was produced and the bending strength and the bending elasticity of the obtained article was measured as the same as the example 1.

Example 4

Following the method described in the example 1, NrC2Si layer as the first layer, and TTS layer as the second layer were laminate coated on the surface of the particulate filler thereby the surface-coated inorganic filler was obtained. Also, as the same as the example 1 except for using said fillers, the viscosity of the preliminary fluid composition was measured, the article was produced, and the bending strength and the bending elasticity of the obtained article were measured.

Example 5

The surface-coated inorganic filler was obtained as the same as the example 1, except for using NrC2Si layer instead of VSi layer as the first layer and VSi layer instead of the NrC2Si layer as the second layer in the surface-coated inorganic filler of the example 1. Also, except for using said fillers, as the same as the example 1, the viscosity of the preliminary fluid compositions was measured, the article was produced, and the bending strength and the bending elasticity of the obtained article were measured.

Example 6

Following the method described in example 1, the surface-coated inorganic filler was obtained by laminate coating VSi layer as the first and the third layer and NrC2Si layer as the second layer, and TTS layer as the fourth layer on the surface of the particulate filler. Also, except for using said fillers, as same as the example 1, the viscosity of the preliminary fluid compositions was measured, the article was produced, and the bending strength and the bending elasticity of the obtained article were measured.

Comparative Example 1 and 2

Following the method described in example 1, on the surface of the particulate filler, only TTS layer was formed in the comparative example 1, and only NrC2Si layer was formed in the comparative example 2, thereby each surface-coated inorganic fillers was obtained. Also, except for using said fillers, as the same as the example 1, the viscosity of the preliminary fluid compositions was measured, the article was produced, and the bending strength and the bending elasticity of the obtained article were measured.

The results of the measurement of the examples 1 to 6, and the comparative examples 1 and 2 are shown in Table 1.

TABLE 1

|  |  | Example 1 | Example 2 | Example 3 | Example 4 | Example 5 | Example 6 | Comparative example 1 | Comparative example 2 |
|---|---|---|---|---|---|---|---|---|---|
| The coupling agent layer | first layer | VSi | VSi | VSi | NrC2Si | NrC2Si | VSi | TTS | NrC2Si |
|  | second layer | NrC2Si | NrC6Si | NrSi | TTS | VSi | NrC2Si |  |  |
|  | third layer | TTS | TTS | TTS |  | TTS | VSi |  |  |
|  | fourth layer |  |  |  |  |  | TTS |  |  |
| The viscosity of the fluid composition (mPa/s) |  | 310 | 430 | 300 | 400 | 330 | 370 | 800 | 2500 |
| The bending strength (MPa) | average (n = 3) | 52 | 64 | 37 | 48 | 51 | 53 | 27 | 43 |
|  | σ | 0.5 | 0.1 | 0.1 | 0.2 | 0.2 | 0.6 | 0.2 | 1.4 |
| The bending elasticity (GPa) | average (n = 3) | 8.9 | 8.9 | 8.9 | 8.6 | 8.6 | 8.5 | 8.2 | 9.4 |
|  | σ | 0.2 | 0.1 | 0.0 | 0.1 | 0.1 | 0.2 | 0.5 | 0.4 |

According to Table 1, the fluid composition including the surface-coated inorganic filler of the present invention comprising more than one layer of the laminated coating layers consisting of the coating layer A and the coating layer B according to the present invention on the surface of the particulate filler, has low viscosity, has good dispersion of said fillers; further the obtained article has high bending strength and bending elasticity (the examples 1 to 6).

On the other hand, when those formed with only one layer of the coating layer over the surface of the particulate filler are used, the viscosity of the fluid compositions become high and the obtained articles have low bending strength and the bending elasticity compared to those of examples 1 to 6 (the comparative examples 1 and 2).

The invention claimed is:
1. A surface-coated reinforcing material comprising laminated coating layers on a reinforcing material surface comprising:

one or more coating layers A comprising a silane coupling agent (I) having at least one hydrocarbon group having a norbornene structure, and
one or more coating layers B comprising a fatty acid and/or a coupling agent other than said silane coupling agent (I),
wherein a thickness of one layer of the coating layers A is 1 molecule layer to 3 molecule layers, and a thickness of one layer of the coating layers B is 1 molecule layer to 30 molecule layers.

2. The surface-coated reinforcing material according to claim 1, wherein said silane coupling agent (I) is a compound shown in a below general formula (Q):

$$R'_g X_p SiR''_h \qquad (Q)$$

wherein each of R' and R", is independently selected from the group consisting of hydrogen atom, a halogen atom, an alkyl group having carbon atoms of 1 to 6, and an alkoxy group having carbon atoms of 1 to 6, X is hydrocarbon group having a norbornene structure, each of g and h is an integer of 0 to 3, p is an integer of 1 to 4, and g+h+p=4.

3. The surface-coated reinforcing material as set forth in claim 1 wherein said coating layer B is made of at least one selected from the group consisting of a silane coupling agent other than said silane coupling agent (I), thiol coupling agent, aluminate coupling agent, titanate coupling agent, and fatty acid.

4. The surface-coated reinforcing material as set forth in claim 1, wherein at least one layer of the coating layer A is at within five layers from an outermost layer of the laminated coating layers of the reinforcing material surface, and the five layers include said outermost layer.

5. The surface-coated reinforcing material as set forth in claim 1, wherein the laminated coating layers of the reinforcing material surface are seven layers or less.

6. The surface-coated reinforcing material as set forth in claim 1, wherein said reinforcing material is an inorganic filler.

7. A fluid composition for a reaction injection molding comprising a norbornene monomer, a polymerization catalyst, and the surface-coated reinforcing material as set forth in claim 6.

8. A production method of a reaction injection molded article comprising the step of bulk polymerizing in a mold, a norbornene monomer by polymerization catalyst in the presence of the surface-coated reinforcing material according to claim 1.

9. A reaction injection molded article obtained by the production method of the reaction injection molded article as set forth in claim 8.

\* \* \* \* \*